J. CROWTHER.
DISPLAY DEVICE.
APPLICATION FILED AUG. 3, 1911.
1,034,884.
Patented Aug. 6, 1912.
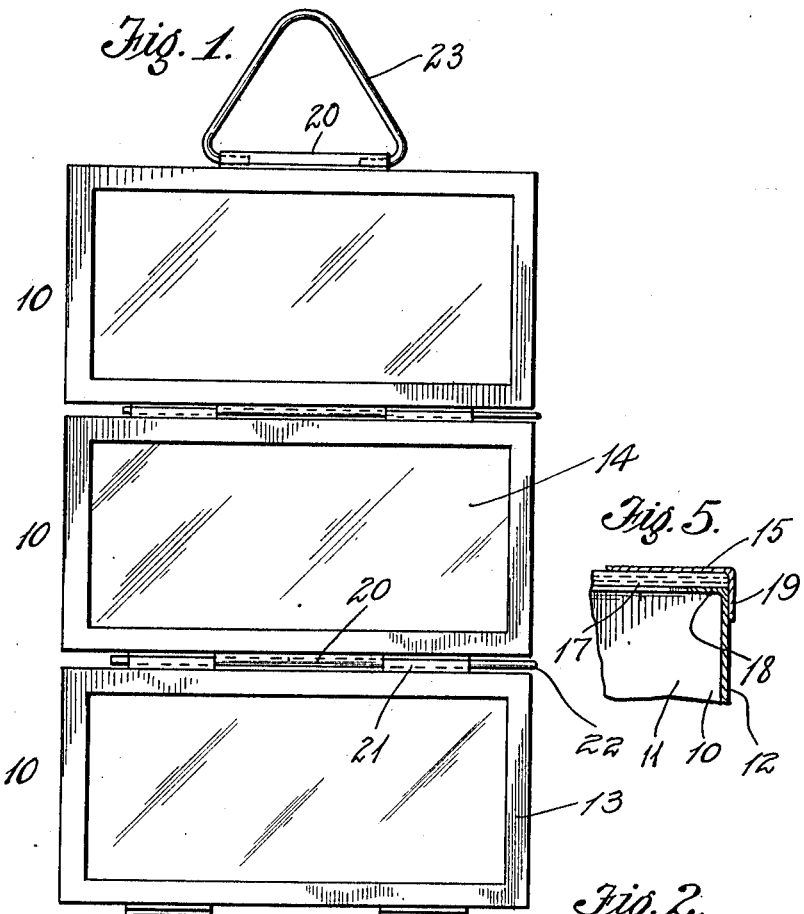
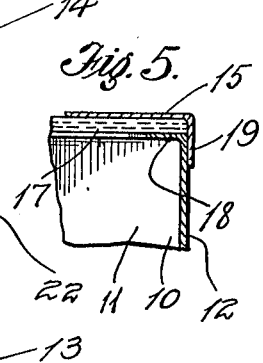
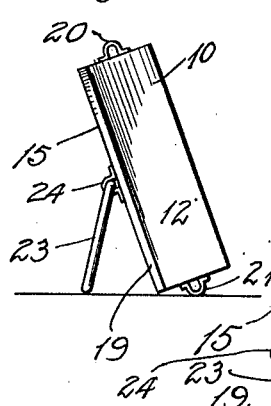
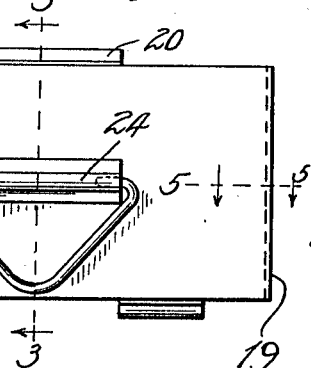
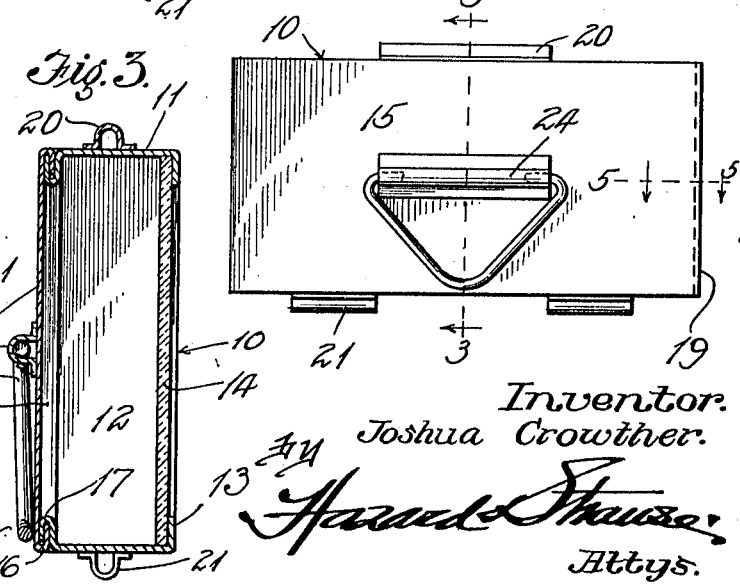
Witnesses.
Inventor.
Joshua Crowther.
Attys.

UNITED STATES PATENT OFFICE.

JOSHUA CROWTHER, OF LONGBEACH, CALIFORNIA.

DISPLAY DEVICE.

1,034,884. Specification of Letters Patent. Patented Aug. 6, 1912.

Application filed August 3, 1911. Serial No. 642,053.

*To all whom it may concern:*

Be it known that I, JOSHUA CROWTHER, a citizen of the United States, residing at Longbeach, in the county of Los Angeles and State of California, have invented new and useful Improvements in Display Devices, of which the following is a specification.

This invention relates to improvements in display devices and has particular relation to display devices that are adapted for exposing to view certain products or manufactures or other lines of goods where the same is displayed behind glass or other transparent holding substance.

It is an object of the invention to provide one or more display casings adapted to contain the articles to be displayed, the casing or casings having transparent walls upon one side through which the goods to be displayed may be shown, the said casing having a removable cover and means for suspending or propping the casing in position at the place where it is desired to show the goods.

It is also an object of the invention to provide a plurality of display casings adapted to contain the goods to be displayed, each of said casings having interlocking connecting means whereby they may be jointed for the purpose of displaying and the purpose of hanging or supporting them upon each other or arranging them at an angle when set upon edge.

It is also an object of the invention to provide a display device with one or more casings having a removable suspending clip and loops for receiving the same upon the edges or the back of the casing, the said loop when placed upon the back of a casing acting as a brace or prop to hold the casing in upright position.

In the accompanying drawing, forming a part of this specification, Figure 1 is a front elevation of the display device showing several sections or casings connected together and extended as when suspended. Fig. 2 is a rear elevation of one of the casings of the display device. Fig. 3 is a transverse sectional view thereof taken upon the line 3—3 of Fig. 2. Fig. 4 is an edge elevation of one of the casings as set up and supported by the handle or suspending cap thereof. Fig. 5 is a fragmentary detail sectional view taken on the line 5—5 of Fig. 2.

The details and features of the invention will now be more particularly described, reference being had to the drawing in which—

10 indicates casings, one or more of which may be employed in displaying goods of any kind. The casings are preferably made alike and a description of one will therefore suffice for all. Each of said casings 10 is formed with side walls 11 and end walls 12 forming a rectangular compartment of any desired width and depth and the front of each casing is formed with an opening, the overhanging flange 13 about the same forming retaining means for a glass plate 14 or other transparent closing means. The goods placed within the casing may thus be made to show through at the front thereof. The rear wall is preferably a movable one as 15 forming a closing slide or door for the casing which when withdrawn permits access to the interior of the casing. The said rear wall is formed with inturned flanges 16 which are adapted to engage a slide upon outwardly turned flanges 17 formed upon the rear edges of the said casing 10. The opening at the back of the casing is adapted to be partially closed by an inturned flange 18 similar to the flange 13 upon the front and the back engaging flanges 17 are formed upon opposite pairs of these flanges. The said back wall is also formed with a flange 19 at one end for limiting its movement when it is closed.

To facilitate the connecting of the different casings, interlocking loops 20 and 21 are formed upon the side edges of the casings. The loops 20 are usually formed upon one edge of each casing while the loops 21 are formed on the other edge thereof and thus only adjacent edges of the casing 10 are brought together. The loops 20 may be made to fit between the loops 21 and a pin or pintle 22 may be passed longitudinally through all of the said loops to connect the casing together. By the use of loops such casing as are shown in the drawing the casings thus have a hinged connection and are capable of being set at an angle with respect to each other when desired.

The casings may be supported in a suspended position from a wall or other surface or upon any other desired support by means of a suspending loop or handle 23. The ends of the handle 23 are readily sprung into the open ends of any of the loops 20 and when so put in place may be employed for suspending one or more casings from any desired support. When a number of the casings are connected together by pintles 22 all of them may be suspended by a single handle 23 as shown in Fig. 1. When the casings are separated one of them may be set up upon edge and be propped in place by the said handle 23, which in that instance is removed from the loops 20 and is sprung into a similar loop 24 secured upon the back wall of the casings as clearly shown in Figs. 2, 3 and 4.

It will be evident that the display device above described is adaptable to many arrangements for the displaying of goods of various kinds. Different goods may be displayed in the different casings or a general line of goods of a given character may be displayed in different forms and grades in a line of casings connected together.

The casings may be laid flat or may be set upon edge or a number of them arranged upon ends especially when secured together by the hinge pintles 22.

The casings being usually made comparatively shallow in depth do not require a large quantity of any given kind of goods to make the desired display, and the goods may be held up against the glass from the inside by placing within the casings any wadding or filling material to fill up the remaining space after the goods have been pressed against the glass front.

What I claim is:—

1. A display device, comprising a plurality of casings having hinged projections upon each of their opposite edges adapted to coöperate with the hinge projections of adjacent casings upon either side, removable pintles connecting the said casings whereby the casings may be set up in angular relation to each other upon their end edges or may be suspended by the side edge of one of the said casings, and means for holding materials to be displayed in the said casings.

2. A display device, comprising a plurality of interchangeable casings having locking hinge projections upon each of their side edges, each of said casings being also provided with a transparent front wall and a removable back wall, the said back wall having loops formed thereon and suspending and supporting handles adapted to engage the loops either at the side or back of the casing for supporting them in suspended or inclined positions.

In witness that I claim the foregoing I have hereunto subscribed my name this 27th day of July, 1911.

JOSHUA CROWTHER.

Witnesses:
  EDMUND A. STRAUSE,
  E. STADLMAN.